United States Patent [19]
Stevens et al.

[11] Patent Number: 5,960,637
[45] Date of Patent: Oct. 5, 1999

[54] TRAILER REFRIGERATION UNIT WITH PIVOTALLY MOUNTED COMPRESSOR AND ENGINE/GENERATOR SET

[75] Inventors: Matthew J. Stevens, East Syracuse; Thomas F. Mallinson, Chittenango; Robert S. Simeone, Bridgeport, all of N.Y.

[73] Assignee: Carrier Corporation, Farmington, Conn.

[21] Appl. No.: 09/072,111

[22] Filed: May 4, 1998

[51] Int. Cl.[6] .................................................. B60P 3/20
[52] U.S. Cl. .................. 62/77; 62/239; 62/298; 123/2; 290/1 A; 322/1
[58] Field of Search ................. 62/77, 239, 298, 62/323.1; 123/2, 198 R; 290/1 A; 322/1

[56] References Cited

U.S. PATENT DOCUMENTS

| | | | |
|---|---|---|---|
| 3,512,373 | 5/1970 | White | 62/239 |
| 3,712,078 | 1/1973 | Maynard et al. | 62/77 |
| 4,109,485 | 8/1978 | Grosskopf | 62/298 |
| 4,136,432 | 1/1979 | Melley, Jr. | 290/1 A |
| 4,173,951 | 11/1979 | Ishihara | 123/2 |
| 5,125,236 | 6/1992 | Clancey et al. | 62/239 |
| 5,222,372 | 6/1993 | DeRees et al. | 62/298 |
| 5,433,175 | 7/1995 | Hughes et al. | 123/2 |
| 5,609,037 | 3/1997 | Fischler | 62/323.1 |
| 5,739,675 | 4/1998 | Green et al. | 322/1 |

*Primary Examiner*—William E. Tapolcai
*Attorney, Agent, or Firm*—Wall Marjama Bilinski & Burr

[57] ABSTRACT

A trailer refrigeration unit has a pivotally mounted engine driven generator unit and a pivotally mounted compressor unit that combine to form a structure that minimizes the spatial "real estate" occupied by the refrigeration unit. A single common rotatable shaft operates the integrally mounted engine and generator to form a unitary unit. The engine driven generator and compressor units can be pivoted out of the refrigeration unit frame to a fully serviceable position that provides easy access to the rear portions of the engine, generator and compressor units without requiring removal of those units from the refrigeration unit.

10 Claims, 4 Drawing Sheets

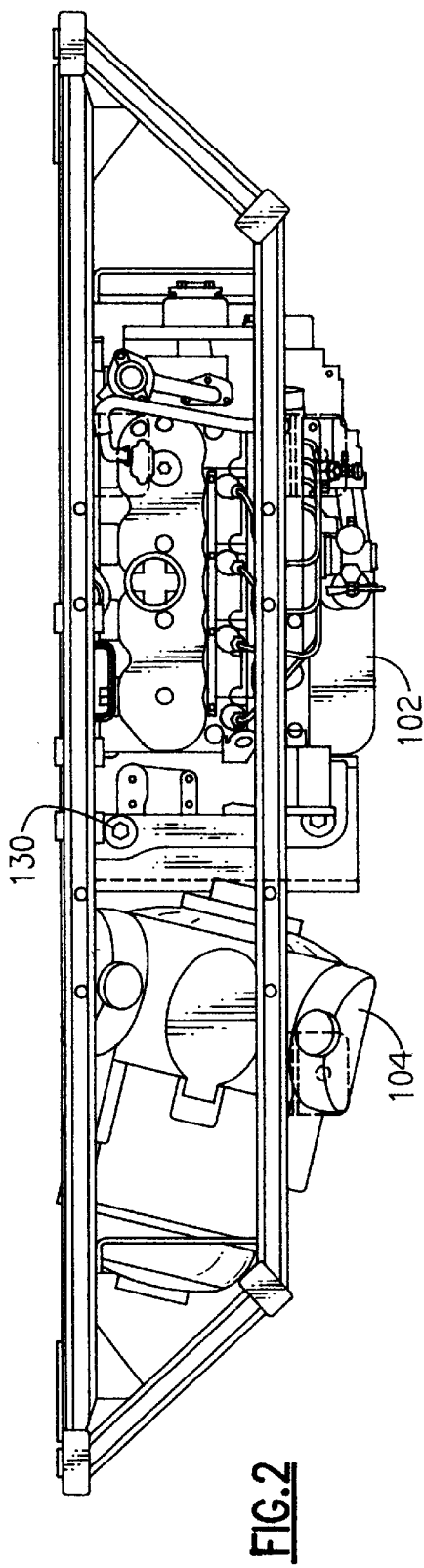
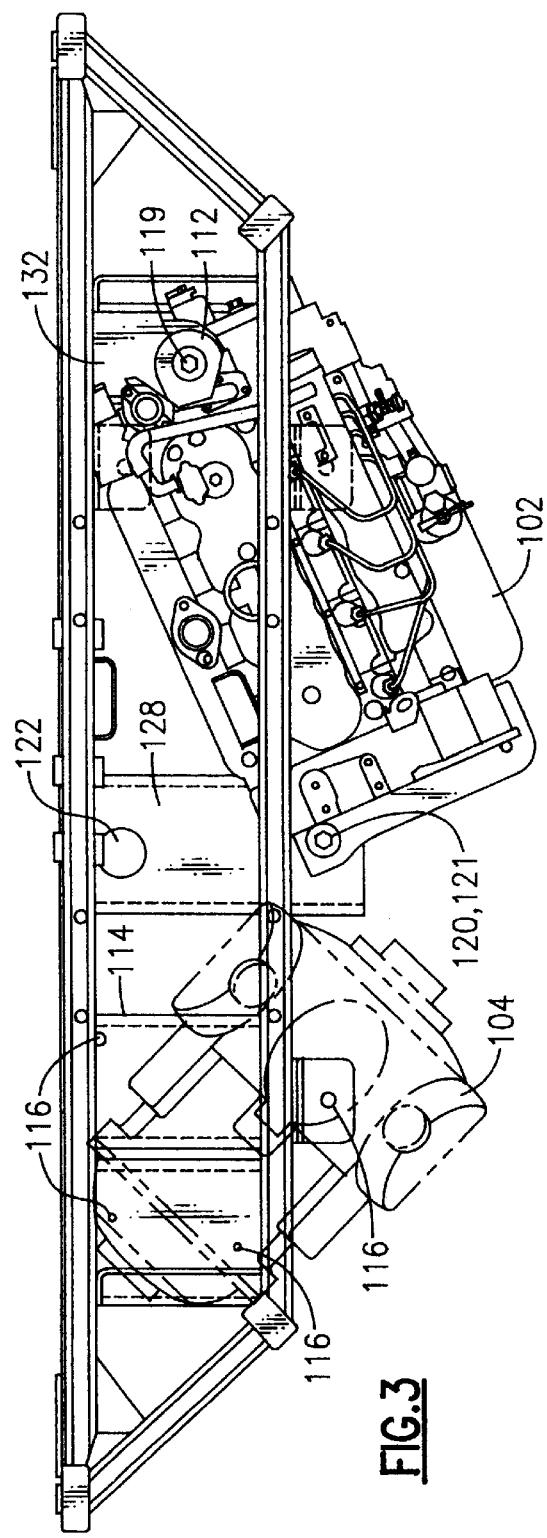

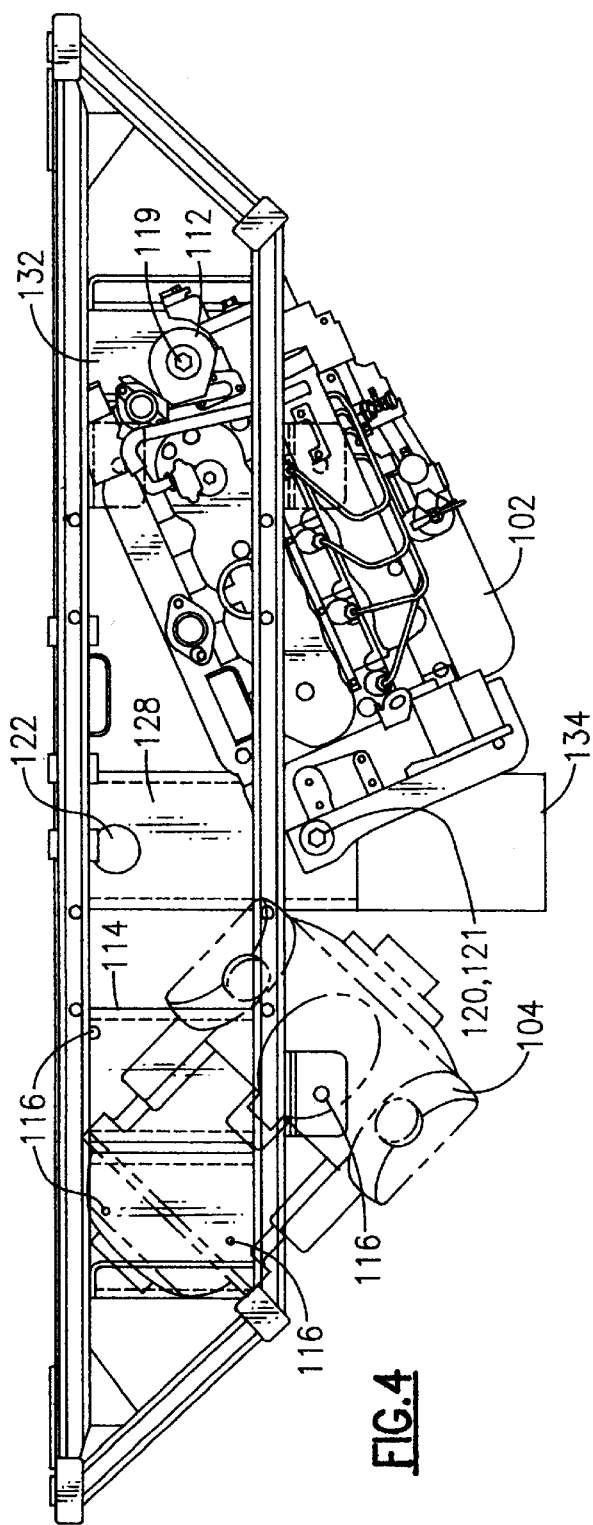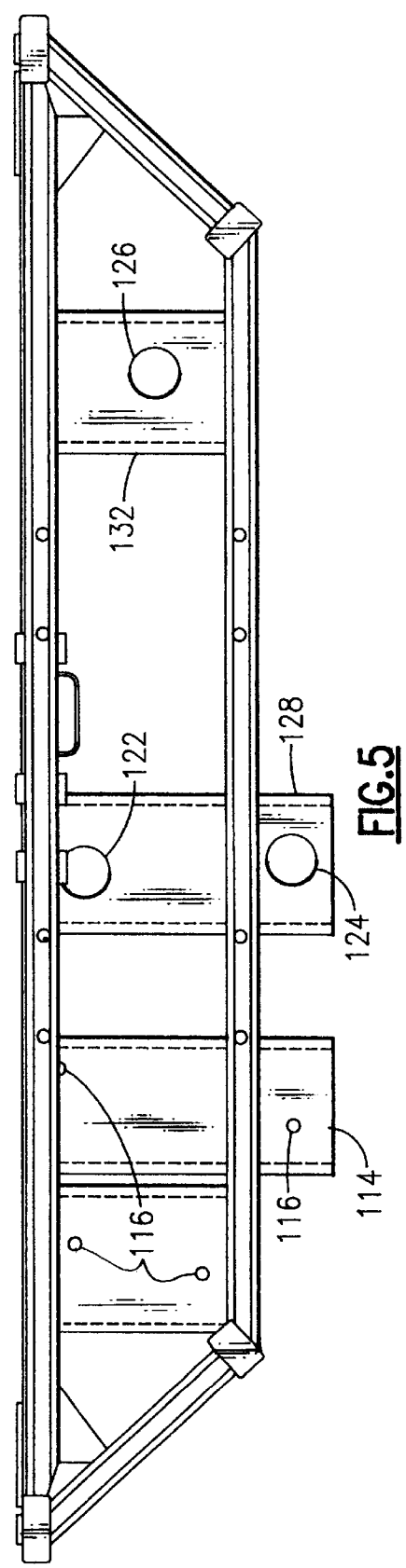

TRAILER REFRIGERATION UNIT WITH PIVOTALLY MOUNTED COMPRESSOR AND ENGINE/GENERATOR SET

BACKGROUND OF THE INVENTION

1. Field of the Invention

This invention relates to transport refrigeration systems. More particularly, this invention relates to a truck trailer refrigeration unit that has a pivotally mounted compressor and engine/generator set allowing ease of serviceability without requiring removal of either the compressor or engine/generator set from the refrigeration unit.

2. Description of the Prior Art

Generally, transport refrigeration systems such as those used on truck trailers, have employed some type of motor or engine driven compressor unit. Most often, these systems have also been combined with various types of motor generator units and/or alternator devices and electronic regulator apparatus to provide the motor and control system power required by the refrigeration system within a package size that is sufficiently small to meet the size constraints that are compatible with transport refrigeration systems. A significant disadvantage of these known engine driven refrigeration systems is the need to provide coupling apparatus between the engine or motor and the compressor. Generally, the engine power is coupled to the compressor via a belt drive or mechanically linked shaft drive mechanism such that the compressor drive shaft necessarily requires a secure shaft seal to ensure that refrigerant does not leak out of the compressor from around the drive shaft. Further, these known systems generally employ belts, sheaves, clutches and turndrives to accommodate delivering power to evaporator fans and condenser fans, thereby increasing overall system maintenance related costs relating to belts, sheaves, clutches and the like. In view of the above, those skilled in the art of transport refrigeration have also been aware that the aforesaid drive shaft seals deteriorate with time and usage, resulting in loss of system refrigerant due to leakage around the compressor drive shaft, creating a long felt need for a viable solution to this problem.

Still needed, but not available with trailer refrigeration units presently known in the art is a compact, light weight, trailer refrigeration unit having an integrally mounted engine driven power generator that is capable of providing electrical power to the refrigeration system compressor motor and all other on-board motors, electrical devices and control system devices in a manner that eliminates maintenance related costs associated with belts, sheaves, clutches and the like, and which allows the engine, power generator, compressor and other integrally mounted devices to be easily serviced without requiring disassembly and/or removal of these integrally mounted devices from the refrigeration unit.

SUMMARY OF THE INVENTION

Accordingly, the present inventive trailer refrigeration unit provides a structure and method intended to overcome many of the shortcomings and attendant disadvantages of known transport refrigeration machines that share problems considered unavoidable within the industry, some of which have been discussed herein above. The present invention surmounts these problems with a radical new structure that combines a compact pivotally mounted engine driven generator unit with a pivotally mounted compressor unit to provide a trailer refrigeration unit that can be easily serviced without requiring either the engine/generator unit or the compressor unit to be removed from the refrigeration unit prior to servicing.

Another feature of the present invention is the provision of a trailer refrigeration unit that eliminates the necessity for compressor drive shaft seals between the compressor and an associated drive motor.

Another feature of the present invention is the provision of a trailer refrigeration unit having a compressor unit constructed with an electric drive motor sealed therein such that the compressor is not susceptible to refrigerant leakage around the compressor drive shaft.

Yet another feature of the present invention is the provision of a trailer refrigeration unit having an integrally mounted engine driven generator that is light weight and compact and that eliminates the necessity for employing belt drive mechanisms or mechanically linked shaft drive mechanisms between the generator unit and its associated drive engine.

Still another feature of the present invention is the provision of a trailer refrigeration unit having improved spatial characteristics free of the "real estate" constraints normally associated with conventional belt drive and shaft drive mechanical linkage configurations.

From the foregoing, it is clear that the present inventive trailer refrigeration unit performance is greatly enhanced over existing systems. Other features of the present inventive apparatus include ease of use, enhanced serviceability, maintainability, upgradability, and enhanced expansion and diagnostics capability.

BRIEF DESCRIPTION OF THE DRAWINGS

Other objects and features of the present invention and many of the attendant advantages of the present invention will be readily appreciated as the same becomes better understood by reference to the detailed description when considered in connection with the accompanying drawings in which like reference numerals designate like parts throughout the figures thereof and wherein:

FIG. 2 is a top cutaway view of the trailer refrigeration unit shown in FIG. 1 depicting the cutaway pivotally mounted engine/generator unit and the pivotally mounted compressor/motor unit in their fully retracted operating positions;

FIG. 3 is a top cutaway view of the trailer refrigeration unit shown in FIG. 1 depicting the cutaway pivotally mounted engine/generator unit and the pivotally mounted compressor/motor unit in their fully pivoted service positions;

FIG. 4 is a top cutaway view of the trailer refrigeration unit shown in FIG. 3, and further including a service shelf plate installed below a portion of the engine/generator unit to provide additional weight support of the engine/generator unit in its serviceable position.

FIG. 5 is a top view of the pivot plates upon which the engine/generator unit and the compressor/motor unit are pivotally mounted according to one embodiment of the present invention.

While the above-identified drawing figures set forth alternative embodiments, other embodiments of the present invention are also contemplated, as noted in the discussion.

In all cases, this disclosure presents illustrated embodiments of the present invention by way or representation and not limitation. Numerous other modifications and embodiments can be devised by those skilled in the art which fall within the scope and spirit of the principles of this invention.

DETAILED DESCRIPTION OF THE PREFERRED EMBODIMENT(S)

The preferred embodiments described herein as follows address the long felt need by those in the truck trailer refrigeration industry to provide a highly efficient, compact, reliable and cost effective truck trailer refrigeration unit that can be quickly and easily serviced without removing either the compressor unit or the motor/generator unit. In accordance with the present invention, the preferred embodiments described herein can readily and reliably function without the need for complex compressor unit drive motor or power generator unit drive engine coupling mechanisms, e.g. sheaves, pulleys, clutches and the like, that are subject to deterioration and breakdown requiring nuisance maintenance.

Figure 1:
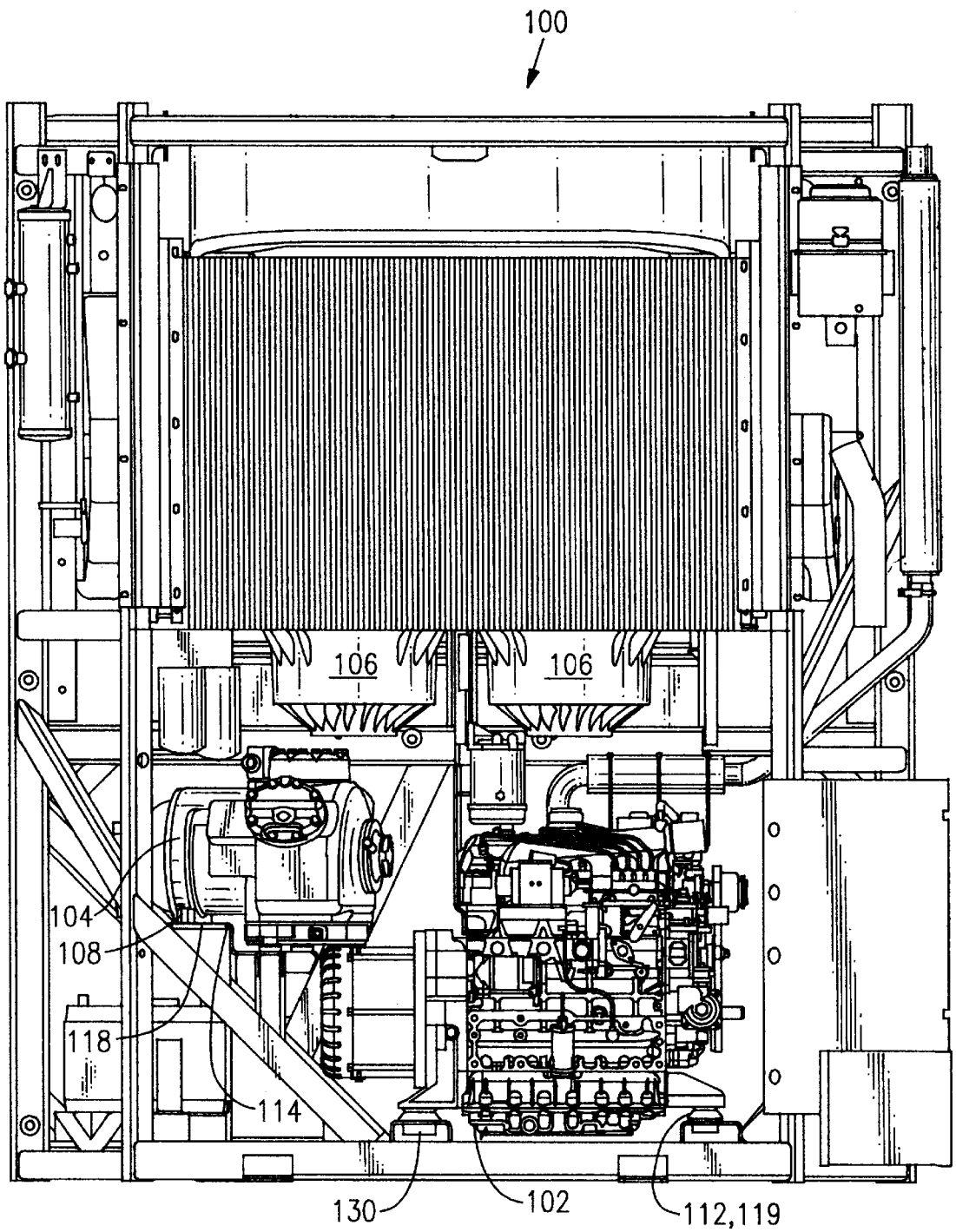
FIG. 1 is a front elevation view of a trailer refrigeration unit that includes a pivotally mounted engine driven generator and a pivotally mounted compressor/motor unit in accordance with one embodiment of the present invention.

Looking now at FIG. 1, a truck trailer refrigeration unit 100 is seen to include a pivotally mounted engine/generator unit 102 and a pivotally mounted compressor/motor unit 104 in accordance with one embodiment of the present invention. The pivotally mounted engine/generator unit 102 provides the necessary electrical power to the electrically powered compressor/motor unit 104 and a host of high power consumption devices such as heaters (not shown) and electrically powered condenser fans 106. The unique structure facilitates service of both the compressor/motor unit 104 and engine/generator unit 102 without requiring removal of either the compressor/motor unit 104 or the engine/generator unit 102 from the trailer refrigeration unit 100. By allowing the compressor/motor unit 104 to pivot on a shelf-like mounting plate 114 about a mounting bolt 108 or like fastening device, the heads and far side of the compressor/motor unit 104 can be easily accessed without having to remove the compressor/motor unit 104 from the refrigeration unit 100 as stated herein above. Similarly, by allowing the engine/generator unit 102 to pivot about a single front mounting bolt 119 on a shock mount 112, the generator and rear side of the engine (engine/generator unit 102) can be serviced without having to remove the engine/generator unit 102 from the refrigeration unit 100 as stated herein before. It can readily be appreciated that such a structure will result in considerable savings in maintenance time required to service the compressor/motor unit 104 and the engine/generator unit 102. For example, valuable time will not be wasted to accomplish alignment of mounting holes, disconnecting wiring harness, and the like such as required with conventional transport refrigeration units known to those skilled in the art.

Referring to FIG. 2 is a top cutaway view of the trailer refrigeration unit 100 shown in FIG. 1 depicting the pivotally mounted engine/generator unit 102 and the pivotally mounted compressor/motor unit 104 in their fully retracted normal operating positions; and referring to FIG. 3 is a top cutaway view of the trailer refrigeration unit 100 shown in FIG. 1 depicting the pivotally mounted engine/generator unit 102 and the pivotally mounted compressor/motor unit 104 in their fully pivoted service positions. As stated herein before, the compressor/motor unit 104 pivots about a single mounting bolt 108 or like fastening device while the mounting plate 114 continues to provide support for the compressor/motor unit 104 in its serviceable position depicted in FIG. 3.

When the desired service is complete, the compressor/motor unit 104 can then be pivoted simply back to its original operating position as shown in FIG. 2.

A set of through holes 116 protruding through the compressor/motor unit 104 mounting plate 114 is configured to removably receive predetermined locking hardware to secure the compressor/motor unit 104 in its operating position. Preferably, mounting feet 118 (depicted in FIG. 1) on the bell housing (rear side) of the compressor/motor unit 104 are continuous in order to provide a surface on which to slide the aforesaid bell housing.

The engine/generator unit 102 pivots around a single front mounting bolt 119 or like fastening hardware, accepted in a through hole 126 (shown in FIG. 5) of a mounting plate 132 and a through hole (not shown) of the engine/generator unit 102, or like fastening connections. The engine/generator unit 102 is supported by a shock mount 112 or other support hardware, attached to the mounting plate 132.

In its serviceable position, shown in FIG. 3, another mounting bolt 121 accepted in a through hole 120 of the engine/generator unit 102, and a through hole 124 (shown in FIG. 5) of a mounting plate 128, or like fastening connections, is used to lock the engine/generator unit 102 to the refrigeration unit 100 frame structure via the mounting plate 128. The mounting bolt 121 assures that the engine/generator unit 102 does not pivot out of its serviceable position and risk falling out of the frame structure. The mounting plate 128 provides support for the engine/generator unit 102 in its serviceable position when the engine/generator unit 102 is exposed and easier to service.

A support frame rail (not shown) of the refrigeration unit 100 is disposed below the mounting plates 114, 128, and 132, and supports the mounting plates 114, 128, and 132. Referring to FIG. 4, an engine/generator unit support embodiment of the invention also include a service support plate 134 that is a temporary fixture and that slidably installs between the mounting plate 128 and the support frame rails. A first portion of the service support plate 134 is between the mounting plate 128 and the support frame rail, and the remainder of the service support plate 134 extends from below the mounting plate 128 and the support rail to a position that is below the engine/generator unit 102 in its serviceable position. The first portion of the service shelf plate 134 is slid under the mounting plate 128 before the engine/generator unit 102 is pivoted into its serviceable position. When the engine/generator unit 102 is in its serviceable position, the engine/generator 102 rests on the service shelf plate 134 as well as on the shock mount 112. The service shelf plate 134 is supported from below by the support frame rail, and supported from above by the mounting plate 128.

The service shelf plate 134 may alternatively be disposed at other positions along the front of the refrigerator unit 100. The service shelf plate 134 may furthermore alternatively be disposed above or below the support frame rail, below the support side of the mounting plate 132. The service shelf plate 134 is temporarily attached to the support frame rail by conventional bracketing apparatus to enable at least a support of a portion of the weight of the engine/generator unit 102 by the service shelf plate 134.

After servicing of the engine/generator unit 102 has been completed, the engine/generator unit 102 can be pivoted back to its normal operating position such as depicted in FIG. 2. The service shelf plate 134 may then be slid away from between the mounting plate 128 and the support frame rail. The engine/generator unit 102 is then secured in its normal operating position with a locking bolt 130 inserted in the through hole 120 and the mounting plate through hole 122, or like fastening hardware. Alternatively or additionally, the engine/generator unit 102 may be secured in its normal operating position to the mounting plate 128 at the mounting plate hole 124 (shown in FIG. 5) by a mounting bolt (not shown) inserted through a front engine/generator unit through hole 125, or like fastening connections and hardware.

FIG. 5 is a top view of the mounting plate 114 upon which the compressor/motor unit 104 is pivotally mounted according to one embodiment of the present invention. The shelf-like mounting plate 114 can be seen in include a set of through holes 116 configured to secure the motor/compressor unit 104 in its normal operating position via a set of fastening hardware when the motor/compressor unit 104 is in its fully retracted position. Mounting plate 128 has a pair of through holes 122, 124 configured to secure the engine/generator unit 102 in its fully retracted and fully extended positions respectively. A third mounting plate 132 has a through hole 126 configured to accept a mounting bolt 119 as stated herein before, and that allows the engine/generator unit 102 to pivot between the fully retracted and fully extended serviceable positions depicted in FIGS. 2 and 3 respectively.

Figure 6:
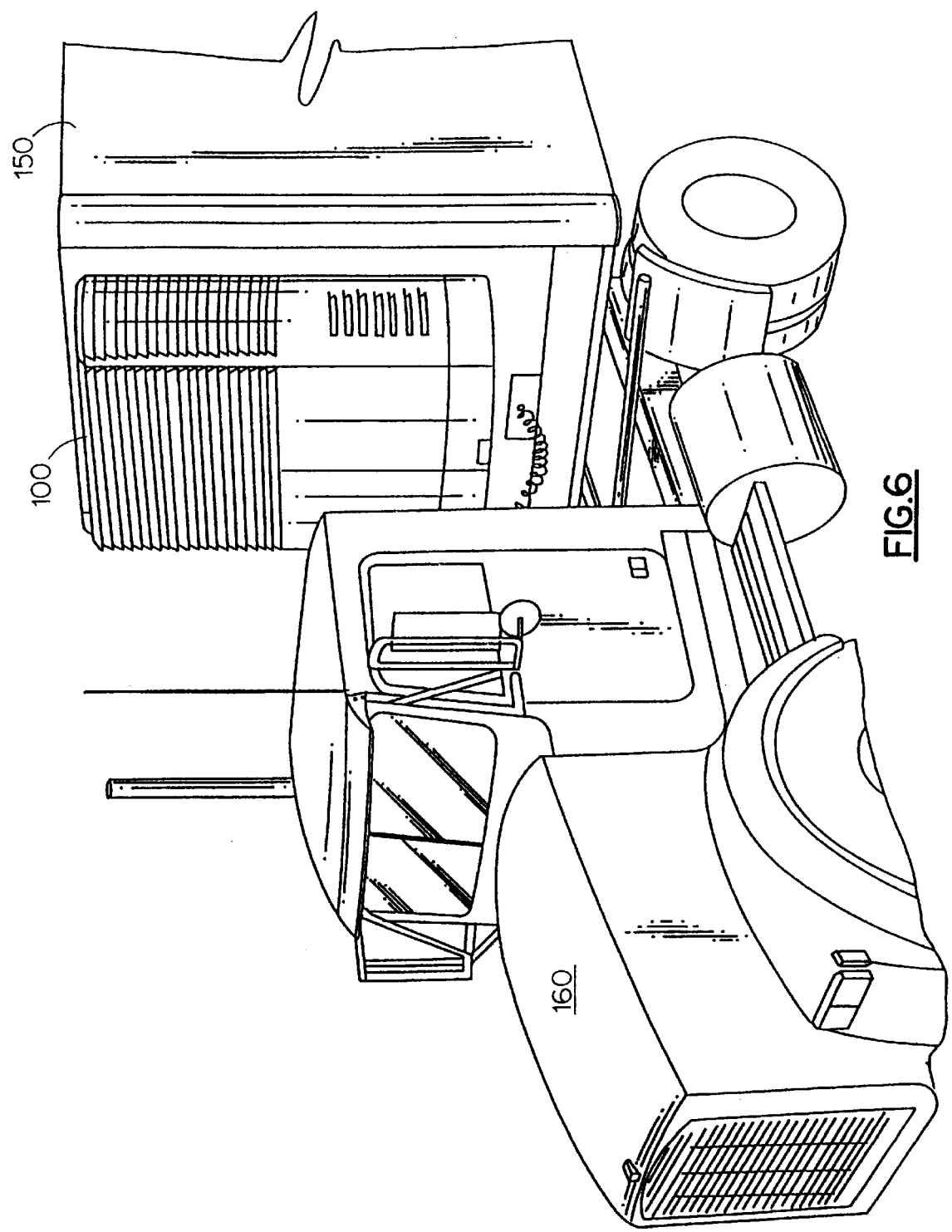
FIG. 6 is a perspective view illustrating the trailer refrigeration unit shown in FIG. 1 functionally attached to a truck trailer.

FIG. 6 illustrates the trailer refrigeration unit 100 depicted in FIG. 1 attached to a truck trailer 150 that is being towed by a truck 160. It can be seen that the physical size and layout of the refrigeration unit 100 is important to allowing operator access to the refrigeration unit 100 components to perform routine maintenance. The physical size and weight of the refrigeration unit 100 is also important to maintaining efficient fuel economy for the truck 160 used for towing the refrigerated trailer 150. It is readily apparent that the novel pivotally mounted motor/compressor unit 104 and pivotally mounted engine driven generator 102 powered trailer refrigeration unit 100 has therefore provided a radical departure from conventional transport refrigeration units known to those skilled in the art of transport refrigeration, to provide a trailer refrigeration unit 100 that is smaller, lighter, more reliable, more accessible for routine maintenance, more efficient, and much simpler in power system construction, all while providing refrigeration system capabilities equal to or greater than those more conventional transport refrigeration systems referenced herein above that are used for substantially identical applications. Unlike the present inventive truck trailer refrigeration unit 100, conventional truck trailer refrigeration units familiar to those skilled in the art necessarily require some disassembly of the refrigeration unit in order to remove and service the compressor and any integrally mounted engines, motors and the like.

Having thus described the preferred embodiments in sufficient detail as to permit those of skill in the art to practice the present invention without undue experimentation, those of skill in the art will readily appreciate other useful embodiments within the scope of the claims hereto attached. For example, although the present invention has been described as useful in truck trailer refrigeration systems, those of skill in the art will readily understand and appreciate that the present invention has substantial use and provides many benefits in other types of transport refrigeration systems as well. In general, the refrigeration industry would find the present invention useful in achieving reliable and efficient cooling for those products where spatial "real estate" must be maintained and energy waste must be eliminated to preserve resources.

In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

We claim:

1. An improved truck trailer refrigeration unit of the type having at least one condenser, at least one evaporator, and at least one electrically powered device, the improvement comprising:

an integrally mounted engine driven generator unit for providing power
for the electrically powered devices forming a portion of the refrigeration unit, the engine driven generator being pivotally attached to at least one engine/generator pivoting apparatus, wherein the at least one engine/generator pivoting apparatus is configured to selectively pivot the integrally mounted engine driven generator unit into and out of the truck trailer refrigeration unit; and an integrally mounted compressor unit operatively coupled to the at least one condenser and the at least one evaporator, the compressor unit being pivotally attached to at least one compressor pivoting apparatus, wherein the at least one compressor pivoting apparatus is configured to selectively pivot the integrally mounted compressor unit into and out of the truck trailer refrigeration unit, such that pivoting the integrally mounted engine driven generator and the integrally mounted compressor unit out of the truck trailer refrigeration unit allows access to rear portions of the engine driven generator and the compressor without removing any energy fueled components from the truck trailer refrigeration unit and without removing the truck trailer refrigeration unit from a trailer upon which the truck trailer refrigeration unit is installed, and further such that pivoting the integrally mounted engine driven generator and the integrally mounted compressor unit into the truck trailer refrigeration unit positions the engine driven generator and the compressor to be in a normal operating mode.

2. The truck trailer refrigeration unit of claim 1 wherein the at least one engine/generator pivoting apparatus is further configured to removably receive predetermined fastening hardware adapted to selectively secure the engine driven generator unit in any one of a fully retracted normal operating mode position and a fully extended serviceable position.

3. The truck trailer refrigeration unit of claim 1, the improvement further comprising a support apparatus that selectively extends out of said truck trailer refrigeration unit to a position abutting at least a portion of said engine driven generator unit in a fully extended serviceable position, and is capable of bearing at least a portion of the weight of said engine driven generator unit in said fully extended serviceable position.

4. The truck trailer refrigeration unit of claim 1 wherein the integrally mounted compressor unit has mounting feet configured to slidably support the compressor unit on a predetermined top portion of the compressor pivoting apparatus.

5. An improved truck trailer refrigeration unit of the type having a compressor unit, an engine driven generator unit, at least one condenser, at least one evaporator, and at least one electrically powered device, the improvement comprising:

first pivoting means attached to at least one engine driven generator unit for selectively pivoting the engine driven generator unit into and out of the truck trailer refrigeration unit; and second pivoting means attached to the compressor unit for selectively pivoting the compressor unit into and out of the truck trailer refrigeration unit, such that pivoting the engine driven generator unit and the compressor unit into a first position allows access to rear portions of the engine driven generator unit and the compressor unit without removing any energy fueled components from the truck trailer refrigeration unit and without removing the truck trailer refrigeration unit from a trailer upon which the truck trailer refrigeration unit is installed, and further such that pivoting the engine driven generator unit and the compressor unit into a second position places the engine driven generator unit and the compressor unit in a normal operating mode.

6. The truck trailer refrigeration unit of claim 5, the improvement further comprising fastening means for selectively securing the engine driven generator unit in any one of a fully retracted normal operating mode position and a fully extended service mode position.

7. The truck trailer refrigeration unit of claim 5, the improvement further comprising support means for bearing at least a portion of the weight of said engine driven generator unit in a fully extended service mode position, wherein said support means extends out of said truck trailer refrigeration unit to a position abutting at least a portion of said engine driven generator unit in a fully extended serviceable position.

8. The truck trailer refrigeration unit of claim 5, the improvement further comprising supporting means for slidably supporting the compressor unit.

9. A method of servicing a truck trailer refrigeration unit of the type having a pivotally mounted engine driven generator unit and a pivotally mounted compressor unit, the method comprising the steps of:

pivoting the engine driven generator unit into a fully extended service mode position;

securing the engine driven generator unit in its fully extended service mode position, thereby preventing the engine driven generator from falling out of the refrigeration unit while it is in the fully extended service mode position;

servicing the secured engine driven generator unit while it is in the fully extended service mode position;

pivoting the serviced engine driven generator unit into a fully retracted normal operating mode position; and securing the serviced engine driven generator unit in its fully retracted normal operating mode position.

10. The method of claim 9 further comprising the steps of:

pivoting the compressor unit into a fully extended service mode position;

servicing the compressor unit while it is in the fully extended service mode position;

pivoting the serviced compressor unit into a fully retracted normal operating mode position; and securing the serviced compressor unit in its fully retracted normal operating mode position, thereby preventing the serviced compressor unit from inadvertently pivoting back into the fully extended service mode position.

* * * * *